3,352,710
PRODUCTION OF BONDED
NON-WOVEN FABRICS
Hans Wolf and Erwin Drescher, Ludwigshafen (Rhine), Gerhard Faulhaber, Mannheim, Hans Wilhelm, Ludwigshafen (Rhine), Hans Reinhard, Limburgerhof, and Ernst Penning, Ludwigshafen (Rhine), Germany, assignors to Badische Anilin- & Soda-Fabrik Aktiengesellschaft, Ludwigshafen (Rhine), Germany
No Drawing. Filed Apr. 1, 1964, Ser. No. 356,665
Claims priority, application Germany, Apr. 13, 1963, B 71,514
4 Claims. (Cl. 117—140)

ABSTRACT OF THE DISCLOSURE

Bonded non-woven fabrics, and processes for producing same by application of binder to non-woven fabric and heating at 60–160° C., using as a binding agent an interpolymer of (a) 55–97.5% of an acrylate or methacrylate of 1–8 carbon alkanols; (b) 2–10% of N-methylolacrylamide or N-methylolmethacrylamide; (c) 0.1 to 4% by weight of monomers having two olefinic double bonds, such as di-esters of diols and acrylic and/or methacrylic acids, diallyl or divinyl ethers of an alkane diol, vinyl esters of said acids, divinyl or diallyl esters of dicarboxylic acids, divinylbenzene, or derivatives or substitution products thereof, bis-acrylamides, etc.; and (d) 0–30% of other copolymerizable compounds such as acrylonitrile, methacrylonitrile, acrylic acid, methacrylic acid, salts of said acids, amides of said acids, styrene, a monovinyl ether, vinyl chloride and vinylidene chloride, the percentages being with reference to the whole interpolymer.

The present invention relates to a process for the production of bonded non-woven fabrics in which the non-woven fabrics are treated with aqueous dispersions.

The use of aqueous dispersions of polymers and copolymers for the production of bonded non-woven fabrics is already known. Dispersions of natural rubber, synthetic rubber or copolymers similar thereto have already been used. Polymers containing polymerized diolefin units however are known not to be resistant to aging.

Polymer dispersions which contain esters of polymerized acrylic or methacrylic acid units and copolymerized monomers having reactive groups, such as carboxylic groups or carboxylic amide groups, have therefore already been used for bonding fibrous products. The said copolymers can then be reacted with substances having reactive groups so that they are crosslinked.

A disadvantage of the said copolymers containing reactive groups when used for bonding fibrous products is that the functional groups in the polymer must react with the crosslinking agent in the outer phase of the dispersion. Bonding is therefore often unsatisfactory and the non-woven fabrics are usually insufficiently resistant to washing and to solvents.

Attempts have also already been made to use for bonding, copolymers which have previously been crosslinked, for example by copolymerizing bifunctional compounds having crosslinking action, such as vinylbenzene or butanediol diacrylate, into the copolymers. To ensure the resistance to solvents of the non-woven fabrics provided with the said copolymers, it is necessary to use relatively large amounts of compounds having crosslinking action. These large amounts impair the bond strength of the binding agent to the fibers and therefore impair the mechanical strength of the non-woven fabric.

If dispersions of copolymers which have self-crosslinking atomic groupings, for example copolymers of esters of acrylic acid with N-methylolacrylamide or N-methylolmethacrylamide be used for bonding the non-woven fabrics, the disadvantages which occur when using crosslinked polymers or copolymers having reactive groupings may be avoided. Difficulties have however been encountered in the practical use of these self-crosslinking copolymers containing amino groups. Although the strength of non-woven fabrics finished with copolymers containing self-crosslinking atomic groupings and also the resistance of these non-woven fabrics to solvents are quite satisfactory, the non-woven fabrics thus prepared cannot be satisfactorily proceeded. Polymer particles are deposited on the rapidly rotating blades used during fabrication and this prevents satisfactory cutting.

We have now found that the said difficulties can be obviated and uniformly bonded non-woven fabrics having good solvent resistance and good mechanical strength are obtained by using for bonding fibrous products an aqueous dispersion of a copolymer which contains at least 55% by weight of one or more esters of copolymerized acrylic acid and/or methacrylic acid units, 2 to 10% by weight of copolymerized N-methylolacrylamide and/or N-methylolmethacrylamide, 0.1 to 4% by weight of copolymerized units of one or more compounds having two polymerizable double bonds and optionally up to about 30% by weight of polymerized units of one or more other compounds having a copolymerizable double bond, the percentages being with reference to the total weight of the polymer.

The said copolymers contain a preponderant amount of one or more esters of acrylic acid and/or methacrylic acid. Esters of acrylic acid and methacrylic acid with alkanols which have one to eight carbon atoms are particularly suitable, for example the butyl esters, isobutyl esters, methyl esters, ethyl esters, propyl esters, hexyl esters, or ethylhexyl esters. These acrylic and methacrylic esters or mixtures of the same are advantageously contained in the copolymer in amounts of 55 to 97.5% by weight with reference to the whole polymer.

The copolymers to be used according to this invention also contain 2 to 10% by weight (with reference to the whole polymer) of copolymerized N-methylolacrylamide and/or N-methylolmethacrylamide units and also 0.1 to 4% by weight (with reference to the whole polymer) of copolymerized units of one or more compounds containing one or two polymerizable double bonds. Particularly suitable compounds of this type are the neutral esters of acrylic acid and/or methacrylic acid with diols, particularly alkanediols having two to six carbon atoms, such as ethanediol diacrylate and butanediol-(1,4) diacrylate. Vinyl esters of acrylic acid and methacrylic acid are also very suitable. Other esters having two polymerizable double bonds, such as divinyl or diallyl esters of dicarboxylic acids and allyl or methallyl esters of acrylic acid and methacrylic acid, and also for example divinylbenzene, its derivatives and substitution products and amide derivatives of ethylenically unsaturated carboxylic acids, such as methylene bisacrylamide are also suitable. The use of aliphatic hydrocarbons and chlorohydrocarbons having two conjugated double bonds, such as butadiene, isoprene and chloroprene is possible but in general is not recommended.

The copolymers to be used according to this invention may also if desired contain up to 30% by weight (with reference to the wholepolymer) of copolymerized units of compounds having a copolymerizable double bond which are not identical with the compounds enumerated above. Particularly suitable comonomers of this type are acrylonitrile and methacrylonitrile, and also acrylic acid and methacrylic acid and their salts or amides, and furthermore compounds such as styrene, vinyl ethers, vinyl chloride and vinylidene chloride.

The dispersions are formed in a conventional way and no claim is made to their production. Conventional emulsifiers, preferably ethenoxylated fatty alcohols, which may be sulfonated, fatty alcohols, sulfonation products of hydrocarbons or alkaryl sulfonates may be used.

The polymerization initiators used in the production of the polymer dispersions are also conventional; compounds forming free radicals are particularly suitable.

The concentrations of the said polymer dispersions may vary within wide limits; they may lie between about 3 and 50% by weight, the concentration being adjusted according to the type of non-woven structure to be bonded. About 20% by weight dispersions are preferred.

Non-woven fabrics which may be bonded according to this invention may consist of synthetic or natural fibers. Examples of such fibers are cotton, wool, silk, rayon staple, synthetic fibers of polyacrylonitrile, polyesters, polyamides, nylon-6, nylon-6,6 or glass fibers or other mineral fibers.

Before or during application of the dispersions to the fibrous material, it may often be advantageous to add to the dispersions additives, for example protective colloids, emulsifiers, wetting agents, foaming agents, antifoaming agents, waterproofing agents, dyes or fillers. In many cases it may be advantageous to add polycondensation products of for example formaldehyde and urea or melamine or etherification products of these condensates.

The non-woven fabrics are preferably provided with the aqueous dispersions of the binder by spraying or soaking. For example the non-woven fabric may be passed through an impregnating bath and the excess of dispersion squeezed off between two rollers. Since the non-woven fabric has at first only low strength, it is often difficult to pass it through the impregnating bath without tearing. It is therefore advantageous to effect preliminary superficial bonding without using substantial tensile stress prior to the actual impregnation. An advantageous method of finally bonding such fabrics is to supply the binder between two non-woven fabrics, to pass them together through two rollers and thus force the binder in under light pressure.

In this way adhesion of the impregnated and still moist non-woven fabric to the squeeze rollers and the pulling out of fibers from the non-bonded surface are avoided.

The fibrous material containing binder is then dried for some time, three to ten minutes usually being sufficient, preferably first at moderate temperature, generally between 60° C. and 100° C., so that the binder begins to crosslink appreciably. The binder is then converted into the insoluble state by subsequent further heat treatment, preferably at 80° C. to 160° C. Purely thermal treatment is sufficient for conversion into the insoluble condition. The period of heating may however be shortened by adding to the binder a compound which accelerates the reaction, for example an acid or compound yielding an acid, such as phosphoric acid, p-toluenesulfonic acid, ammonium nitrate or ammonium oxalate.

Bonded non-woven fabrics prepared according to this invention are outstandingly resistant to aging and do not yellow. They do not exhibit the disadvantages which usually occur when finished non-woven fabrics are cut. Moreover, they are very resistant to washing and to solvents.

Soft and resilient non-woven fabrics are often required in practice, for example as stiffening materials for articles of clothing. Non-woven fabrics which have been prepared using dispersions according to this invention may be processed particularly easily because unlike prior art products they do not offer difficulties in preparing them for processing and because tackiness at the surface of the non-woven materials does not occur. Although this latter disadvantage can be avoided in the prior art methods by using harder copolymers, non-woven fabrics bonded therewith do not have sufficient resilience.

The invention is further illustrated by the following examples. The parts and percentages specified in the examples refer to weight.

Example 1

A carded fleece of an area weight of 40 g./sq. m. made of viscose fibers is impregnated with an aqueous dispersion containing, in 100 parts, 20 parts of an emulsion copolymer of 94% of butyl acrylate, 5% of N-methylolmethacrylamide and 1% of vinyl acrylate, 1 part of an alkarylsulfonate (wetting agent) and 0.5 part of ammonium oxalate to a take-up ratio of about 500% of the weight of fiber (on a wet basis). The fleece is dried at 100° C. and condensed for three minutes at 150° C. The non-woven fabric obtained contains about 100% of binder (solid). It is very porous and has a soft and elastic handle and may be processed without difficulty.

Example 2

The process of Example 1 is repeated with a similar aqueous dispersion which contains 20 parts of an emulsion copolymer of 85% of butyl acrylate, 10% of acrylonitrile, 3% of N-methylolmethacrylamide and 2% of ethylene glycol diacrylate. The well bonded non-woven fabric obtained is resistant to solvents.

Example 3

The process of Example 1 is repeated using a cotton fleece with a dispersion containing a copolymer of 2% of divinylbenzene, 5% of N-methylolacrylamide, 10% of styrene and 83% of ethyl acrylate.

Example 4

The process of Example 1 is repeated using a polyester fleece having an area weight of 60 g./sq. m. and a dispersion containing a copolymer of 90% of propyl acrylate, 7% of N-methylolmethacrylamide and 3% of divinyl adipate.

Example 5

A carded fleece having an area weight of about 40 g./sq. m. made from polyamide fibers is impregnated to a retention ratio (wet basis) of about 500% with an aqueous dispersion which contains, in 100 parts, 20 parts of an emulsion copolymer of 85% of ethyl acrylate, 5.5% of acrylic acid, 7% of N-methylolmethacrylamide and 2.5% of butanediol diacrylate, 2 parts of ethenoxylated p-isooctylphenol having about twenty ethenoxy units (emulsifying agent), 1 part of an alkaryl sulfonate (wetting agent) and 0.5 part of zinc chloride. The fleece is dried at 100° C. and condensed for three minutes at 150° C. The bonded non-woven fabric has a plastics content of about 100% (solid). It is very soft, resilient and resistant to cleaning.

Example 6

The procedure of Example 5 is followed using a cotton fleece and a dispersion containing a copolymer of 87.5% of butyl acrylate, 8% of acrylic acid, 4% of N-methylolacrylamide and 3.5% of tricyclodecenyl acrylate.

Example 7

The procedure of Example 5 is repeated with a similar aqueous dispersion which contains 20 parts of an emulsion copolymer of 81% of butyl acrylate, 10% of acrylic acid, 7% of methylolmethacrylamide and 2% of butanediol diacrylate. The non-woven fabric obtained is very soft and porous. It has good resilience and may be used very well as a stiffening material because it can be processed very satisfactorily.

Example 8

A carded fleece having an area weight of 50 g./sq. m. made from viscose fibers and polyamide fibers is impregnated in the ratio 70:30 with an aqueous dispersion which contains, in 100 parts, 20 parts of an emulsion copolymer of 75% of butyl acrylate, 15% of methyl acrylate, 5% of acrylic acid, 3% of N-methylolmethacrylamide and 2% of vinyl acrylate, 1 part of ethenoxylated p-isooctylphenol having about twenty ethenoxy units (emulsifying agent), 1 part of an alkarylsulfonate (wetting agent), 1 part of tetramethylolglyoxaldiureine and 0.5 part of zinc chloride, to a retention ratio of about 400% (wet basis). The fleece is dried at 100° C. and condensed for three minutes at 150° C. The non-woven fabric obtained contains about 80% of binder (solid); it is very permeable, has a soft handle and is very resilient. The product has outstanding suitability as stiffening material and may be processed very satisfactorily.

*Example 9*

The procedure of Example 8 is repeated using a wool fleece having an area weight of 50 g./sq. m. and a dispersion containing a copolymer of 88% of ethyl acrylate, 5% of methylmethacrylamide, 4% of diallyl adipate and 3% of N-methylolmethacrylamide.

*Example 10*

The procedure of Example 8 is repeated using a fleece of nylon-6 fibers and a dispersion containing a copolymer of 76% of butyl acrylate, 10% of acrylonitrile, 10% of styrene, 3% of N-methylolmethacrylamide and 1% of ethylene glycol dimethacrylate.

*Example 11*

The procedure of Example 8 is repeated using a fleece of 80% of cotton and 20% of polyester fibers and a dispersion containing a copolymer of 92.5% of isobutyl acrylate, 5% of N-methylolacrylamide and 2.5% of allyl methacrylate.

*Example 12*

The procedure of Example 8 is repeated with a dispersion containing a copolymer of 85% of ethyl acrylate, 7% of N-methylolmethacrylamide, 5% of acrylic acid and 3% of hexanediol diacrylate.

*Example 13*

The procedure of Example 8 is repeated using a rayon staple fleece and a dispersion containing a copolymer of 71% of ethylhexyl acrylate, 20% of styrene, 5% of N-methylolmethacrylamide and 4% of diallyl heptadecane dicarboxylate.

*Example 14*

The procedure of Example 1 is repeated using a fleece of nylon-6 and a dispersion containing a copolymer of 50% of ethyl acrylate, 43% of butyl acrylate, 5% of N-methylolmethacrylamide and 2% of butanediol divinyl ether.

*Example 15*

The procedure of Example 1 is repeated using a fleece which is 50% cotton and 50% polyester fibers and a dispersion containing a copolymer of 87.5% of butyl acrylate, 6% of N-methylolacrylamide, 5% of acrylonitrile and 1.5% of ethylene glycol diallyl ether.

*Example 16*

The procedure of Example 1 is repeated using a wool fleece and a dispersion containing a copolymer of 71% of butyl acrylate, 22% of methyl acrylate, 4% of N-methylolmethacrylamide and 3% of diallyl maleate.

The non-woven fabrics prepared according to Examples 1 to 16 may be cut very satisfactorily during fabrication and leave no smears on the cutting tools.

They have outstanding resistance to solvents.

We claim:

1. A bonded non-woven fabric containing as the binding agent an interpolymer of (a) 97.5 to 55% by weight of an ester selected from the group consisting of acrylates and methacrylates of alkanols having 1 to 8 carbon atoms in the alkanol component; (b) 2 to 10% by weight of a compound selected from the group consisting of N-methylolacrylamide and N-methylolmethacrylamide; and (c) 0.1 to 4% by weight of a copolymerizable monomer containing two olefinic double bonds, the percentages being in reference to the whole interpolymer.

2. A bonded non-woven fabric containing as the binding agent an interpolymer of (a) 97.5 to 55% by weight of an ester selected from the group consisting of acrylates and methacrylates of alkanols having 1 to 8 carbon atoms in the alkanol component; (b) 2 to 10% by weight of a compound selected from the group consisting of N-methylolacrylamide and N-methylolmethacrylamide; (c) 0.1 to 4% by weight of a copolymerizable monomer containing two olefinic double bonds; and (d) up to 30% of at least one another copolymerizable monomer containing an olefinic double bond, the percentages being in reference to the whole interpolymer.

3. A bonded non-woven fabric containing as the binding agent an interpolymer of (a) 97.5 to 55% by weight of an ester selected from the group consisting of acrylates and methacrylates of alkanols having 1 to 8 carbon atoms in the alkanol component; (b) 2 to 10% by weight of a compound selected from the group consisting of N-methylolacrylamide and N-methylolmethacrylamide; and (c) 0.1 to 4% by weight of a compound having two olefinic double bonds and selected from the group consisting of diacrylate and dimethacrylate esters of saturated diols, a diallyl and divinyl ether of an alkanediol, vinyl acrylate, vinyl methacrylate, divinyl esters of dicarboxylic acids, dialkyl esters of dicarboxylic acids, allyl or methallyl esters of acrylic or methacrylic acid, divinyl benzene, substituted divinylbenzene, and bisacrylamides, the percentages being with reference to the whole interpolymer.

4. A bonded non-woven fabric containing as the binding agent an interpolymer of (a) 97.5 to 55% by weight of an ester selected from the group consisting of acrylates and methacrylates of alkanols having 1 to 8 carbon atoms in the alkanol component; (b) 2 to 10% by weight of a compound selected from the group consisting of N-methylolacrylamide and N-methylolmethacrylamide; (c) 0.1 to 4% by weight of a compound having two olefinic double bonds and selected from the group consisting of diacrylate and dimethacrylate esters of saturated diols, a diallyl and divinyl ether of an alkanediol, vinyl acrylate, vinyl methacrylate, divinyl esters of dicarboxylic acids, diallyl esters of dicarboxylic acids, allyl or methallyl esters of acrylic or methacrylic acid, divinylbenzene, substituted divinylbenzene, and bisacrylamides; and (d) up to 30% by weight of a member selected from the group consisting of acrylonitrile, methacrylonitrile, acrylic acid, methacrylic acid, salts of said acids, amides of said acids, styrene, a monovinyl ether, vinyl chloride and vinylidene chloride, the percentages being with reference to the whole interpolymer.

References Cited

UNITED STATES PATENTS

| | | | |
|---|---|---|---|
| 2,897,101 | 7/1959 | Graulich et al. | 117—139 |
| 3,137,589 | 6/1964 | Reinhard et al. | 117—140 |
| 3,157,562 | 11/1964 | Kine et al. | 117—140 |
| 3,231,533 | 1/1966 | Garrett et al. | 117—140 |

WILLIAM D. MARTIN, *Primary Examiner.*

T. G. DAVIS, *Assistant Examiner.*